SILAGE DISTRIBUTOR AND SUPPORT THEREFOR
Filed Dec. 19, 1966 
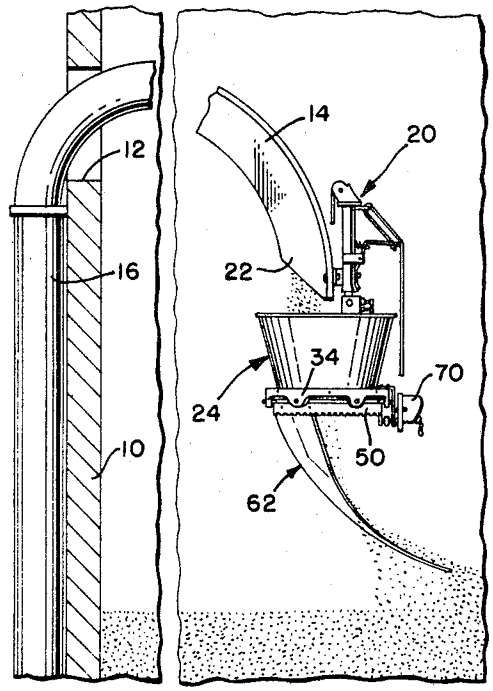
Fig. 1
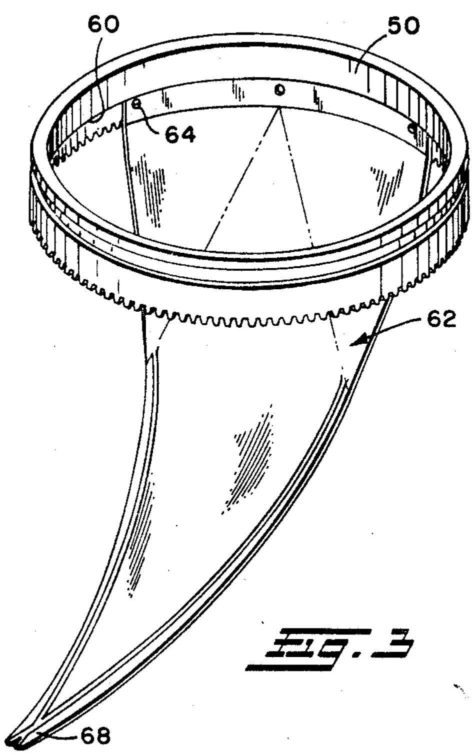
Fig. 3
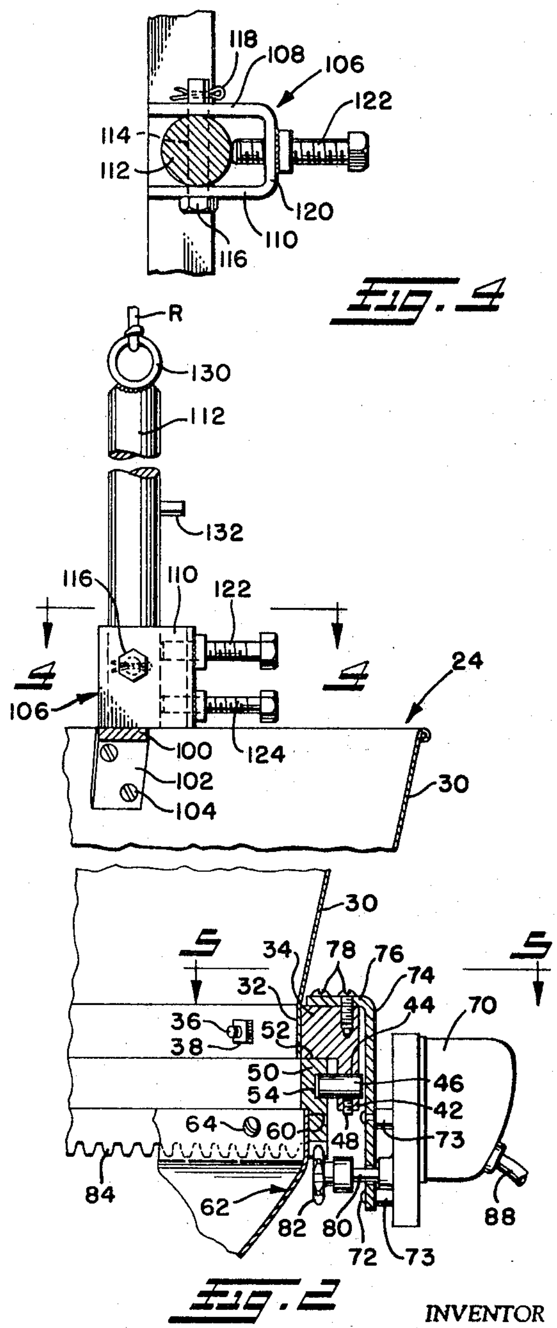
Fig. 4
Fig. 2
INVENTOR
JOHN J. SHANKLAND
BY Oberlin, Maky & Donnelly
ATTORNEYS

INVENTOR
JOHN J. SHANKLAND

BY *Oberlin, Maky & Donnelly*
ATTORNEYS

United States Patent Office 3,422,972

Patented Jan. 21, 1969

3,422,972

SILAGE DISTRIBUTOR AND SUPPORT THEREFOR

John J. Shankland, R.D. 1 Box 535, Doylestown, Ohio 44230

Filed Dec. 19, 1966, Ser. No. 602,719
U.S. Cl. 214—17 8 Claims
Int. Cl. B65g *65/30, 11/00;* A01f *25/16*

ABSTRACT OF THE DISCLOSURE

A distributor having a funnel with a stationary ring attached to the lower end thereof, and a distributor ring mounted for rotation relative to the stationary ring, said distributor ring having a curved blade attached thereto for rotation therewith.

The present invention relates as indicated to a silage distributor and support therefor, and more particularly to an improved motor driven silage distributor and associated supporting mechanism by means of which the distributor can be quickly and accurately releasably locked in operative position adjacent the top of the silo.

As well understood by those in the art, if silage is simply blown to the upper region of the silo and directed to the interior thereof through a gooseneck and downpipe generally centrally positioned within the silo, a generally cone-shaped buildup of the silage is unavoidably produced. Such uneven buildup of silage is undesirable for a number of reasons, including a substantial reduction in silo capacity owing to the relatively poor packing adjacent the silo wall and the substantially increased spoilage as a result of such poor packing. Moreover, the uneven silage buildup adversely affects the removal of the silage from the silo, and impairs silo life.

Various silage distributors have been employed in the past for distributing the silage directed thereto in particular distribution patterns. Although such distributors are a substantial improvement over the previously employed center pipe arrangement, they have not been wholly satisfactory. The motor driven types of distributors to which the present invention particularly relates have tended to be rather bulky and cumbersome, and as a result have been not only relatively expensive but somewhat difficult to raise and install in place. Further, the units have been designed so as to be susceptible to accumulation of silage and dust which potentially impair the positive rotation of the distributor.

With the above in mind, a primary object of the present invention is to provide a distributor which is simply constructed and light in weight, and which can be quickly and easily installed with virtually any size gooseneck or blower pipe.

A further object of the present invention is to provide such a distributor wherein the drive and supporting surfaces for the rotary distributor are essentially self-cleaning.

A still further object of the present invention is to provide a distributor the distributing surface of which is constructed for evenly building up the silage in the silo.

Yet another object of the present invention is to provide a novel hitch fixedly mounted in the silo and adapted to automatically receive and releasably support the distributor when the latter is raised in the silo to the vertical position of the hitch.

Another object of the present invention is to provide such a hitch which functions to securely retain the distributor and thereby eliminate lateral swinging motion thereof, and which is provided with novel latch releasing means for uncoupling the distributor from the hitch to permit lowering of such distributor downwardly in the silo.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary, side elevational view of a typical silo having the improved silage distributor and support therefor of the present invention operatively mounted therein;

FIG. 2 is an enlarged, fragmentary sectional view of the distributor, showing the manner in which the distributor ring is mounted for rotary movement;

FIG. 3 is a perspective view of the distributor ring and distributor blade mounted thereon;

FIG. 4 is a sectional view taken on line 4—4 of FIG. 2;

Figure 5:
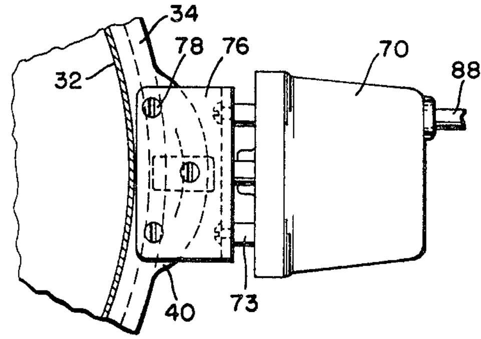
FIG. 5 is a sectional view taken on line 5—5 of FIG. 2.

Referring now in more detail to the drawings, wherein like parts are designated by like reference numerals, and initially to FIG. 1, there is fragmentarily shown therein a silo 10 of conventional construction typical of the type of structure with which the present invention is particularly designed for use. In the form shown, the silo 10 is formed with an opening 12 in the side wall thereof relatively adjacent the top of the silo through which extends the gooseneck 14 of blower pipe 16. The latter is adapted to be suitably attached to the outlet end of a blower unit (not shown) which can be of any suitable construction for accomplishing the intended purpose. The invention thus far described is conventional and has been described only to the extent necessary to provide a full understanding of the present improvements.

A hitch assembly generally indicated at 20 is rigidly secured to the lowermost end 22 of the gooseneck 14 and is adapted to releasably receive the distributor assembly generally indicated at 24. As will be hereinafter described in more detail when particular reference is made to FIG. 4, the distributor assembly 24 can be raised in the silo by a person standing on the walkway outwardly of the silo, with the distributor assembly 24 being automatically releasably latched to the hitch 20 for support thereby during the silage distributing operation.

Referring now to FIGS. 2–5, the distributor assembly 24 includes a funnel 30 which is formed adjacent the bottom thereof with a generally cylindrical bottom flange 32. An outer, stationary ring 34 is rigidly secured to the flange 32 by any suitable securing means such as, for example, bolts 36 and nuts 38, a plurality of which are provided spaced circumferentially around the bottom flange 32.

The stationary ring 34 is formed with a plurality of circumferentially spaced radially projecting shoulders commonly designated at 40, FIG. 5, having downwardly extending bottom portions 42. Each of such bottom portions 42 is apertured as indicated at 44 for receiving pin 46 the leading edge of which extends radially inwardly beyond the inner face of the bottom portion 42. The pins 46 may be made of a suitable friction resistant material such as nylon or Teflon and are preferably press-fit in place in the openings 44 and retained therein by set screws 48.

A preferably cast distributor ring 50 is mounted directly below the annular bottom face 52 of the fixed ring 34 radially within the circumferentially spaced lower portions 42 thereof. The ring is formed with an annular groove 54 in the exterior face thereof for receiving the pins 46 thereby to support the ring 50 for rotation relative to the outer stationary ring 34. The ring 50 is formed with an annular recess 60 at the lower end of the inner face thereof for receiving a curved distributor blade generally indicated at 62, with the latter being held in place by any suitable means such as bolts 64.

As can best be seen perhaps in FIG. 3 the upper, mounted region of the distributor blade 62 extends circumferentially approximately ⅓ the circumference of the ring 50. In the form shown, the distributor blade 62 is in the form of an essentially elongated triangle with the lower, free end 68 thereof being substantially reduced almost to a point. The shape of the distributor blade 62 provides an improved distribution pattern, as will be pointed out in more detail hereinbelow.

An electric drive motor 70 is mounted by mounting bolts 72 and spacers 73 on flange 74 which is in turn rigidly mounted at the upper flanged end 76 thereof to one of the radially enlarged shoulder portions 40 of the ring 34, by bolts 78 or the like. The output shaft 80 of the electric drive motor has mounted thereon a drive gear 82 the teeth of which are adapted to intermesh with teeth 84 formed continuously around the bottom edge of the distributor ring 50. The power cord 88 of the motor 70 can be suitably connected to a source of electric power.

It will thus be seen that operation of the motor 70 will drive the distributor ring 50 which is supported in its rotative movement by the several pins 46 which are received by the annular groove or recess 54 formed in the ring. The motor 70 is preferably of the gear reduction type for turning relatively slowly the distributor ring thereby serving more uniformly to deflect the silage material.

The above-described distributor drive arrangement has numerous operational advantages over previous drive mechanisms for distributors of this general type. Initially, the groove 54 is formed in the outer face of the distributor ring 50 out of the path of the silage directed to the assembly through the funnel 30. The likelihood of material working itself into the groove 54 is thus substantially eliminated. Moreover, as described the pins 46 are stationary and any material reaching the groove 54 will be forced therefrom by the pins 46, thereby making the distributor supporting arrangement essentially self-cleaning.

It will further be noted that the gear drive arrangement is similarly self-cleaning, with the forming of the teeth 84 in the bottom face of the distributor ring 50 eliminating the accumulation of deleterious material between the gear teeth. Moreover, the weight of the distributor ring downwardly on the drive gear 82 provides a positive interengagement of the gear teeth. In addition to the noted operational advantages, the drive structure is relatively inexpensive to manufacture inasmuch as the teeth 84 can be formed with the casting of the distributor ring 50, thereby eliminating costly machining operations.

Figure 6:
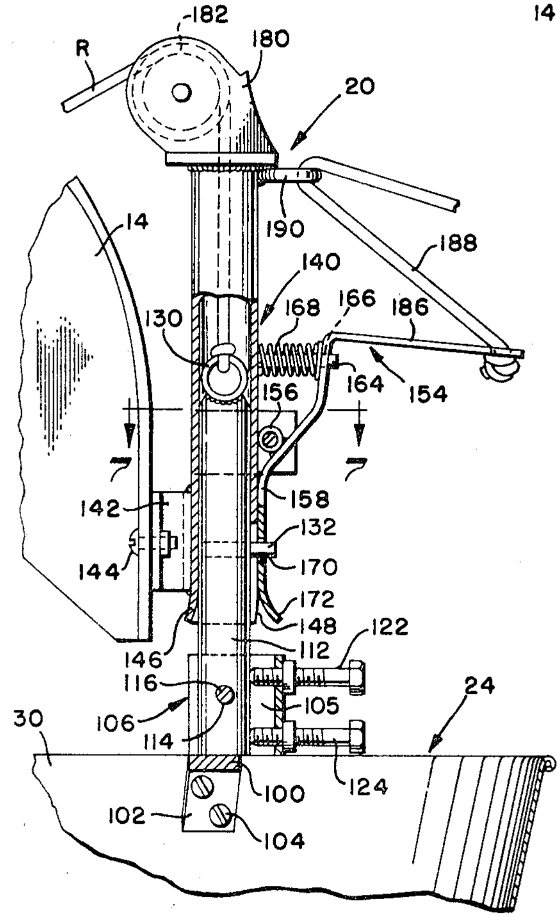
FIG. 6 is an enlarged, fragmentary, side elevational view of the novel hitch means of the present invention and the manner in which the same releasably retains the distributor assembly.

Referring now to the manner in which the distributor assembly 24 is releasably retained by the hitch 20, a transverse bar 100 is mounted across the funnel 30 at the top thereof, FIG. 6, with the bar 100 being formed with end flanges 102 for securing the bar to the funnel by bolts 104 or the like. A yoke generally indicated at 106 is rigidly attached by welding or the like to the bar 100 generally centrally thereof, with the opposed legs 108 and 110 thereof, FIG. 4, receiving therebetween a pipe 112 formed with a transverse opening 114 for receiving bolt 116 which extends through aligned apertures formed in legs 108 and 110 of the yoke thereby to vertically support the pipe 112 relative thereto. A cotter pin 118 or the like can be employed to hold the pin 116 in such position. The connecting web section 120 of the yoke 106 is formed with two threaded openings for receiving set screws 122 and 124 which are adapted to be threaded into end contact with the pipe 112. In this manner, the pipe 112 can be oriented vertically or in a desired angular position and then locked in such orientation through the manipulation of the set screws 122 and 124.

The pipe 112 is provided at the top thereof with a ring 130 adapted to receive through the opening thereof a rope R or the like by means of which the distributor assembly 24 can be raised in the silo as will be hereinafter described. The pipe 112 is further provided with a pin 132 which in the form shown extends diametrically through the pipe 112 with one end thereof projecting from a periphery thereof for a purpose to be presently described.

Figure 7:
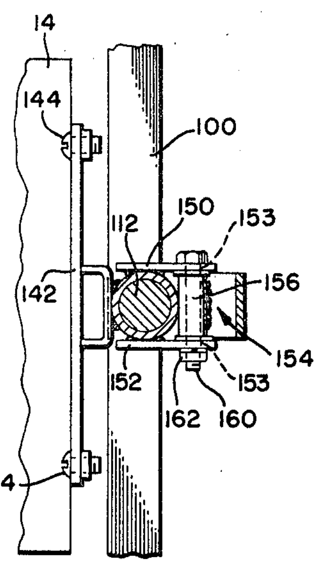
FIG. 7 is a sectional view taken on line 7—7 of FIG. 6.

Referring now to FIGS. 6 and 7, the hitch assembly 20 includes a cylindrical sleeve generally indicated at 140 which is rigidly mounted to the gooseneck 14 by means of a bracket 142 welded or otherwise secured to the sleeve 140 relatively adjacent the bottom thereof, with mounting bolts 144 in the form shown being employed for attachment of the bracket 142 to the gooseneck 14. The inside diameter of the sleeve 140 is greater than the outside diameter of the pipe 112 so that the latter may be telescopically received within the former for releasable support thereby.

The lower end 146 of the sleeve 140 is outwardly flared as indicated and a downwardly diverging guide slot 148 is formed in the flared portion 146 generally opposite the gooseneck 14. The guide slot 148 is dimensioned to receive and guide the pin 132 carried by the pipe 112, with the bottom end of the slot serving to limit the vertically upward movement of the pipe 112 into the sleeve 140.

Plates 150 and 152 are welded or otherwise secured to the exterior of the sleeve 140 and formed with aligned apertures commonly designated at 153. A generally L-shaped retaining bracket generally indicated at 154 is pivotally mounted between the plates 150, 152, with the bracket 154 being formed with a hinge section 156 formed on the generally vertical leg 158 of the bracket. The hinge section 156 is adapted to receive a pivot pin 160 which extends through the openings 153 in the plates 150, 152, with the end of the pin 160 being threaded to receive a securing nut 162. The width of the bracket 154 is slightly less than the distance between the plates 150, 152 thereby to permit pivotal movement of the bracket 154 relative thereto.

A pin 164 is carried by the sleeve 140 and extends radially outwardly through a guide opening 166 provided therefor in the leg 158 of the bracket 154. A compression spring 168 is disposed around the pin 164 between the sleeve and the bracket leg 158 and serves to bias the latter counterclockwise about the pivotal axis thereof through the pin 160.

The leg 158 of the bracket 154 is generally dish-shaped with the generally flat, intermediate region thereof being biased by such spring 168 into contact with the outer periphery of the sleeve 140. The leg 158 is formed with an opening 170 which is adapted to receive the pin 132 of the pipe 112 when the latter is directed upwardly telescopically within the sleeve 140. The extreme lower end 172 of the bracket leg 158 is flared outwardly and is engaged by the pin 132 for when the pipe 112 is moved toward its latched, locked position, with the leg 158 being cammed counterclockwise about the pin 160 thereby compressing the coil spring 168.

A pulley block generally indicated at 180 is rigidly attached to the top of the sleeve 140 and a sheave 182 is rotatably carried by the pulley block in conventional manner. As previously indicated, the ring 130 is adapted to receive a rope R which extends upwardly over the sheave 182 as shown in FIG. 6. It will thus be seen that the rope R can be used to support and lift the distributor assembly 24 upwardly in the silo until the same has moved into locked position within the hitch assembly 20.

The top leg 186 of the bracket 154 is apertured adjacent the outer end thereof for receiving a rope or the like 188 which can be knotted or otherwise retained at such end adjacent the bracket. The sleeve 140 carries adjacent the top thereof a ring 190 through which the rope 188 can extend as shown in FIG. 6. It will be seen that when the free end of the rope 188 is tensioned, the bracket 154 will be pivoted counterclockwise about the pivotal axis through the pin 160 thereby to move the leg 158 of the bracket 154 away from the sleeve 140 thereby disengaging completely the pin 132 from the opening 170 thereby freeing the distributor assembly for controlled descent.

The manner in which the distributor assembly 24 can be received and locked by the hitch assembly 20 should be apparent from the above description. As the distributor assembly is pulled upwardly in the silo by the rope R, the pin 132 carried by the pipe 112 will be received by the guide slot 148 formed in the sleeve 140 and thereby orient the distributor assembly relative to the hitch. As the pin 132 enters the guide slot 148, it will simultaneously engage the lower, outwardly flared end 172 of the bracket 154 and cam the same outwardly thereby pivoting the entire bracket 154 clockwise about the pin 160 and compressing the spring 168. As the pipe 112 continues to ascend within the hitch assembly, the pin 132 will eventually reach the level of opening 170 formed in the leg 158 of the bracket 154 whereupon it will snap in place by virtue of the resilient biasing of the bracket 154 by the spring 168, with the intermediate flat portion of the bracket leg 158 resiliently contacting the outer periphery of the sleeve in such region. The pipe 112 and thus the distributor assembly 24 are thereby firmly locked in place, thereby permitting the tension on the rope R to be released and the apparatus left unattended. Thus, the distributor assembly is automatically guided toward the hitch assembly and is supported and locked thereby without requiring manual effort other than pulling the rope R for lifting the distributor in the silo, or possibly some swinging movement of the distributor assembly to align pin 132 with the guide slot 148.

When the silage distributor 24 has been locked in place as described, the motor 70 is connected to a current source and the apparatus is immediately ready for operation. It will be noted that in addition to firmly locking the distributor assembly 24 in supported position, the hitch assembly 20 stabilizes the distributor and prevents wobbling or rotating of the funnel 30.

The starting of the motor 70 will serve to rotate the distributor ring 50 as described whereby the silage emanating from the end of the gooseneck 14 will contact the deflector blade 62 carried by the ring 50. The deflector 62 is preferably constructed and arranged so that the main path of the silage contacts the deflector approximately intermediate the mounted and free ends thereof and is deflected downwardly and outwardly by the deflector. The generally triangular shape of the deflector blade 62 serves an important function, specifically, to deflect a progressively lesser amount of silage as the same gravitates toward the bottom end of the deflector. In this manner, relatively equal amounts of silage are directed radially outwardly from generally the axis of the distributor thereby providing a uniform, level buildup of the silage within the silo. As will be apparent, if a majority of the silage were directed outwardly from the bottom end of the deflector, there would result an undesirably large buildup of silage adjacent the walls of the silo thereby producing a distribution pattern of generally inverted cone shape in section. As above noted, a cone-shaped buildup of the silage within the silo, whether inverted or otherwise, is highly undesirable for the reasons indicated.

When it is desired to dismount the distributor assembly 24, the rope 188 is tensioned thereby pivoting the bracket

154 counterclockwise about the pin 160 and moving the leg 158 away from the sleeve 140 to terminate the engagement of the pin 132 and the opening 170. The pipe 112 and thus the distributor assembly 24 are now free to descend, which descent can be controlled by the rope R. The rope 188 can conveniently extend outwardly to the exterior of the silo thereby to obviate the necessity of crawling into the domed area of the silo to uncouple the distributor assembly for lowering the same.

It will thus be seen that the present invention affords distinct operational advantages when compared with previous equipment of this general type. The means for rotatably driving the distributor plate is simply constructed, positive acting and essentially maintenance free. Both the gear drive surface and the annular recess in the outer face are self-cleaning thereby eliminating heretofore existing problems of clogging and dust buildup. The distributor can be installed quickly and automatically merely by raising the same into operative, locked position within the hitch assembly. When in such locked position, the distributor funnel is firmly supported and held from wobbling or inadvertent rotation. The silage emanating from the gooseneck and impinging upon the deflector plate is deflected generally uniformly radially outwardly from the distributor thereby to provide a uniform, level buildup of silage within the silo. At the termniation of the distributing operation, the distributor assembly, if desired, can be uncoupled from the hitch assembly merely by rope actuation which frees the distributor for controlled descent.

Other modes of applying the principles of the invention may be employed, change being made as regards the details described, provided the features stated in any of the following claims or the equivalent of such be employed.

I therefore particularly point out and distinctly claim as my invention:

1. A distributor for continuously uniformly distributing silage or like material fed thereto, comprising a funnel, a stationary ring rigidly attached to said funnel adjacent the lower end thereof, a rotary distributor ring, means for supporting said distributor ring for rotation relative to said stationary ring, the bottom of said distributor ring being formed with a continuous series of gear teeth, a distributor blade carried by said distributor ring for rotation therewith, said distributor blade being curved and extending below said distributor ring, motor means mounted on said stationary ring, and drive gear means driven by said motor and operatively engaging the bottom gear surface of said distributor ring thereby to rotate the same and the distributor blade carried thereby.

2. The combination of claim 1 wherein said means for supporting said distributor ring comprises a plurality of circumferentially spaced pins carried by said stationary ring and extending radially inwardly therefrom, said distributor ring being formed with an annular groove in the outer face thereof adapted to receive said pins for supporting said distributor ring relative to said stationary ring.

3. The combination of claim 1 wherein said distributor blade is generally of elongated triangular shape thereby to pass progressively more material toward the transversely reduced, lower ends thereof.

4. The combination of claim 1 further including a vertically extending pipe member operatively connected to said funnel, said pipe member being provided with means for releasably coupling said distributor to a stationary hitch assembly.

5. The combination of claim 4 further including yoke means rigidly attached to said funnel means pivotally mounting said pipe member on said yoke for pivotal movement of said pipe member about an axis generally normal to the axis of said funnel, and means for retaining said pipe member in its pivotally adjusted position.

6. The combination of claim 1 further including a hitch assembly for releasably supporting said distributor, said hitch assembly including a cylindrical sleeve, said funnel having operatively connected thereto an upwardly extending pipe adapted to be telescopically received within said cylindrical sleeve, and means for releasably locking said pipe within said cylindrical sleeve.

7. The combination of claim 6 wherein said means for releasably locking said pipe comprises a generally L-shaped bracket pivotally mounted on the exterior of said sleeve, spring means for biasing one leg of said bracket into resilient engagement with said sleeve, said one leg of said bracket being formed with a cam end portion, and pin means provided on the exterior of said pipe for engaging said cam end portion of said one leg of said bracket for pivoting said bracket against the bias of said spring, said one leg of said bracket being formed with an opening adapted to receive said pin when the latter is vertically aligned therewith thereby to lock said pipe and thus said distributor in said hitch.

8. The combination of claim 7 wherein said sleeve is outwardly flared adjacent the bottom thereof, said sleeve in such region being formed with a guide slot adapted to receive said pin, said guide slot being generally radially aligned with said opening formed in said one leg of said bracket.

References Cited

UNITED STATES PATENTS

| | | | |
|---|---|---|---|
| 3,135,363 | 6/1964 | Bourassa. | |
| 3,151,720 | 10/1964 | Orr et al. | 214—17 XR |
| 3,251,632 | 5/1966 | Stoltzfus. | |

ROBERT G. SHERIDAN, *Primary Examiner.*

U.S. Cl. X.R.

193—3; 248—320